US005079403A

United States Patent [19]

Sturges et al.

[11] Patent Number: 5,079,403

[45] Date of Patent: Jan. 7, 1992

[54] NOZZLE FOR PLASMA ARC TORCH

[75] Inventors: James R. Sturges, Rockford; Steven P. Donovan, Roscoe, both of Ill.

[73] Assignee: W. A. Whitney Corp., Rockford, Ill.

[21] Appl. No.: 600,903

[22] Filed: Oct. 22, 1990

[51] Int. Cl.$^5$ .......... B23K 9/00

[52] U.S. Cl. .......... 219/121.5; 219/121.48; 219/75; 219/121.39

[58] Field of Search .......... 219/121.5, 121.47, 121.48, 219/121.51, 121.49, 121.59, 75, 76.16, 121.39

[56] References Cited

U.S. PATENT DOCUMENTS

| | | | |
|---|---|---|---|
| 2,919,370 | 12/1959 | Giannini et al. | 313/231 |
| 2,923,811 | 2/1960 | Feldmeyer et al. | 219/121 |
| 3,304,774 | 2/1967 | Poole | 73/147 |
| 3,914,573 | 10/1975 | Muehlberger | 219/121.47 |
| 3,928,745 | 12/1975 | Demars et al. | 219/121 |
| 4,650,953 | 3/1987 | Eger et al. | 219/121 |
| 4,882,465 | 11/1989 | Smith | 219/121.5 |
| 4,896,017 | 1/1990 | Koppel et al. | 219/121 |
| 4,909,914 | 3/1990 | Chiba et al. | 219/121.47 |

*Primary Examiner*—Mark H. Paschall
*Attorney, Agent, or Firm*—Leydig, Voit & Mayer

[57] ABSTRACT

The nozzle includes an axially extending discharge passage of circular cross-section and having a convergent entrance portion, a constricted throat which is axially and circumferentially convex, and an enlarged diameter exit portion which is concave in the axial direction as well as in the circumferential direction. The annular wall which defines the axially concave exit portion terminates perpendicular to the extreme end of the nozzle. By virtue of the shape of the passage, the plasma is discharged from the nozzle at supersonic velocity and substantially in the form of a collimated stream so as to effect faster and squarer cutting of a metal workpiece.

4 Claims, 1 Drawing Sheet

NOZZLE FOR PLASMA ARC TORCH

BACKGROUND OF THE INVENTION

This invention relates generally to a plasma arc torch for cutting thick metal work plates and, more particularly, to an improved nozzle for directing the plasma stream of the torch toward the plate.

Plasma arc torches for cutting thick work plates are well known as disclosed, for example, by Scott U.S. Pat. No. 4,338,507. In general, a plasma arc torch comprises a body having an electrode adapted to be connected to a voltage source and adapted to direct an electric arc downwardly toward the workpiece. A pressurized flow of oxygen-containing gas such as air is directed past the electrode and into the arc. The gas is ionized by the arc and creates an extremely hot plasma stream for cutting through the workpiece.

Located below the electrode is a nozzle formed with a passage which shapes the plasma stream and increases its velocity. The discharge passages of the nozzles of commercially available plasma arc torches include a converging entrance portion, a rather long cylindrical intermediate portion and a diverging exit portion defined by a pair of axially superimposed chamfers. Because of the shape of the nozzle passage, the plasma stream is discharged from the nozzle at subsonic velocity. Shock waves cause the stream to diffuse and, as a result, the cut at the top of the workpiece on both sides of the kerf is enlarged and gradually converges downwardly before the cut becomes square. Thus, it is difficult to make a right-angled cut along the edge of the workpiece.

SUMMARY OF THE INVENTION

The general aim of the present invention is to provide a new and improved plasma arc torch nozzle in which the discharge passage is uniquely shaped to cause the plasma stream to produce a squarer and faster cut than has been possible heretofore.

A more detailed object of the invention is to achieve the foregoing through the provision of a nozzle in which the exit portion of the discharge passage is concavely radiused in an axial direction in order to enable the plasma stream to be discharged at supersonic velocity and in a straighter and more fully developed flow so as to effect faster and squarer cutting.

In still more detailed aspects, the invention resides in terminating the radiused exit portion of the discharge passage perpendicular to the workpiece, in the specific dimensional parameters of the axially radiused exit portion, in the ratio of the diameter of the exit portion to the diameter of a constricted throat in the passage, and in the specific shape of the throat.

These and other objects and advantages of the invention will become more apparent from the following detailed description when taken in conjunction with the accompanying drawings.

DETAILED DESCRIPTION OF THE PREFERRED EMBODIMENT

Figure 3:
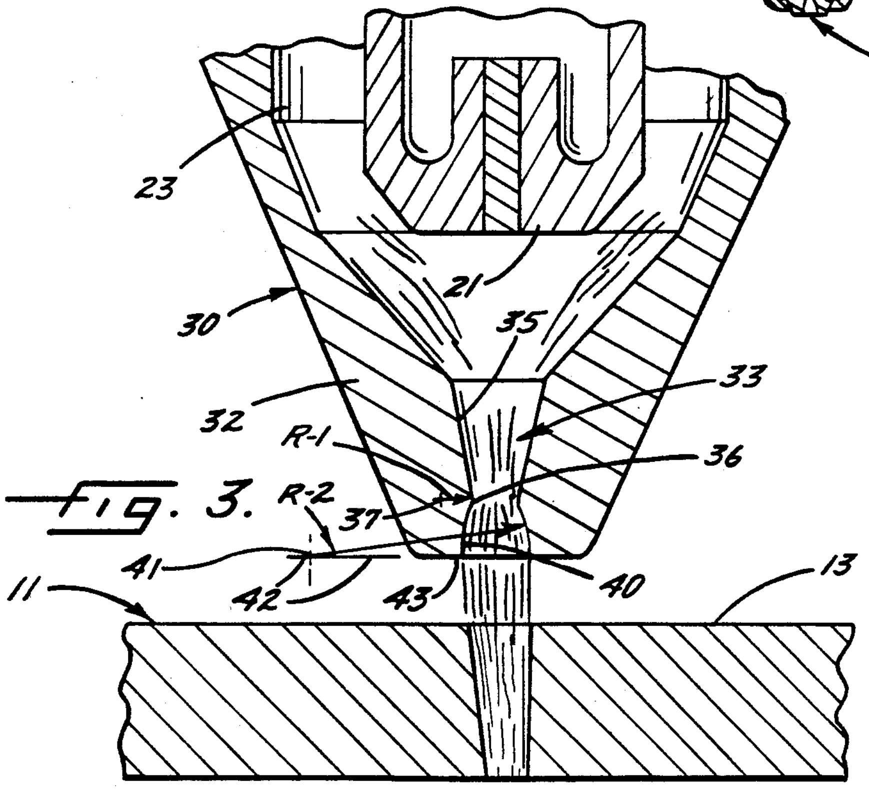
FIG. 3 is a still larger fragmentary cross-sectional view showing the electrode and the discharge nozzle of the torch.

For purposes of illustration, the present invention is shown in the drawings in connection with a plasma arc torch 10 for cutting a sheet metal workpiece 11. The workpiece is disposed in a horizontal plane, is supported on an underlying table 12 and is adapted to be moved to various positions beneath the torch. The torch cuts through the workpiece to cut a work blank 13 (FIG. 3) of predetermined shape out of the workpiece. Before the blank 13 is cut from the workpiece 11, the torch may cut large holes and/or slots in the blank.

Figure 1:
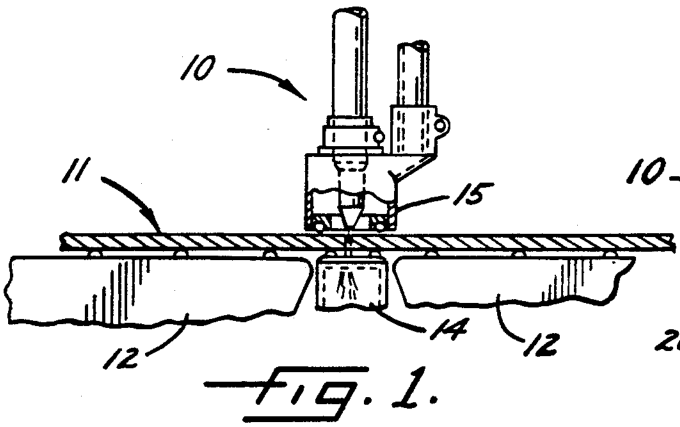
FIG. 1 is a fragmentary front elevational view showing a typical plasma arc torch cutting through a workpiece.

In general, a plasma arc torch discharges an extremely high temperature plasma stream to cause instantaneous melting of the underlying portion of the workpiece 11 and to blast the molten metal downwardly from the workpiece. The molten metal and fumes are directed into a tubular duct 14 (FIG. 1) which underlies the workpiece in vertical alignment with the torch 10. Additional fumes are drawn off through an upper collection hood 15. Plasma arc cutting is generally accepted as the preferred method of cutting sections up to 6" thick from stainless steel and non-ferrous or clad metals that are not easily cut by oxygen fuel gas processes.

Figure 2:
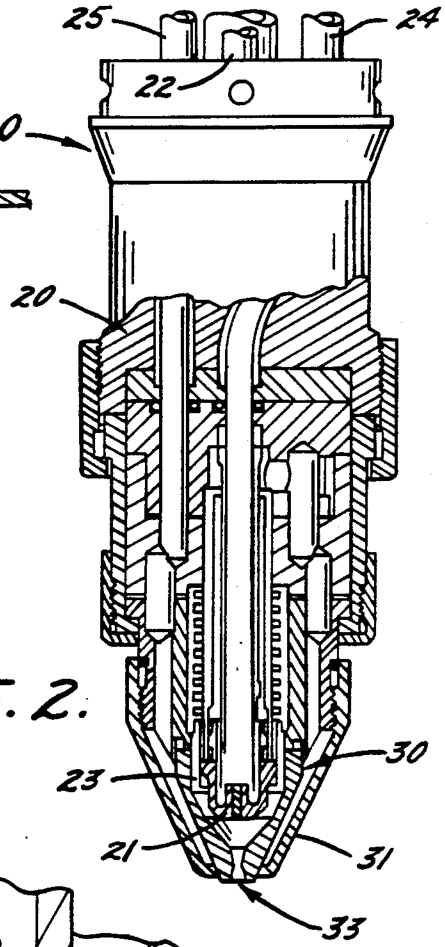
FIG. 2 is an enlarged elevational view of the torch with certain parts broken away and shown in section.

More specifically, the torch 10 includes a vertically extending body 20 (FIG. 2) whose lower end portion houses an electrode 21. The electrode is adapted to be connected to one terminal of a d.c. voltage source whose other terminal is connected to the workpiece 11, the latter thus forming an electrode which coacts with the electrode 21. When voltage is applied to the electrodes, a high temperature electrical arc shoots across a narrow gap of about five millimeters between the workpiece and the extreme lower end of the torch 10. At the same time, a downward flow of pressurized air from a line 22 (FIG. 2) is injected through an annular passageway 23 around the electrode 21 and is ionized by the arc so as to create a hot plasma stream ranging in temperature between 20,000 and 50,000 degrees F. The extreme heat melts the metal workpiece with the oxygen in the stream promoting the cutting and with the pressure of the stream blasting the molten metal downwardly out of the cut. During the cutting operation, the torch 10 is cooled by water admitted into the body 20 via an inlet line 24 (FIG. 2) and discharged from the body by way of an outlet line 25.

Supported within the body 20 and surrounding the electrode 21 is a nozzle 30 (FIGS. 2 and 3) which, in turn, is surrounded by a nosepiece 31 (FIG. 2) secured to the lower end of the body. The nozzle shapes the plasma stream, increases its velocity and directs the stream downwardly toward the workpiece 11.

The present invention contemplates the provision of a nozzle 30 having a lower discharge end portion 32 (FIG. 3) with a uniquely shaped discharge passage 33 which increases the velocity of the plasma stream into the supersonic range while reducing diffusion of the stream as it is discharged from the nozzle. As a result, the torch 10 is capable of cutting at higher speeds and is capable of making a squarer cut.

More particularly, the discharge passage 33 through the nozzle 30 is centered below the electrode 21 and is of circular cross-section throughout its length. The passage 33 includes an upper entrance portion 35 (FIG. 3) which converges radially inwardly upon progressing downwardly so as to increase the velocity of the plasma stream. The specific shape of the entrance portion 35 is not particularly critical so long as the entrance portion is convergent. While the annular wall which defines the entrance portion could be axially radiused, it herein is frustoconical and, in this particular instance, tapers from a diameter of about 0.126" to a diameter of about 0.065" upon progressing along an axial length of about 0.175".

Immediately downstream of the converging entrance portion 35, the passage 33 is formed with a restricted throat 36. The throat is defined by an annular wall portion which preferably is convexly radiused, both circumferentially and axially. The arc defined by the axially convex curvature of the throat 36 herein is struck on a radius R-1 of about 0.039" and from a center 37 which lies in a horizontal plane extending through the midpoint of the arc. The minimum diameter of the throat in this case is about 0.063".

Pursuant to the invention, the passage 33 is formed with an exit portion 40 located immediately downstream of the throat 36 and formed by an annular wall portion which is concavely radiused in the axial direction as well as in the circumferential direction. Importantly, the arc defined by the axially concave curvature of the exit portion is struck on a radius R-2 and from a center 41 which lies in a horizontal plane 42 extending through the extreme lower end 43 of the nozzle 30. Thus, the annular wall which defines the exit portion 40 is perpendicular to the end 43 of the nozzle at the junction of such wall and the nozzle end. The radius R-2 is relatively large and, in the present nozzle, is 0.362". The concavely radiused exit portion 40 blends smoothly with the convexly radiused throat 36 and expands to a diameter of about 0.082" at the extreme lower end 43 of the nozzle and over an axial length of about 0.087".

With the nozzle passage 33 configured and sized as described above, the plasma stream is discharged from the exit portion 40 at a velocity approximately twice the speed of sound thereby resulting in a substantial reduction in shock waves. Because the wall portion of the exit portion 40 is perpendicular to the lower end 43 of the nozzle 30 at the extreme lower end of the exit portion, the plasma stream is substantially collimated and does not significantly diffuse before striking the workpiece 13. Due to the high velocity and the collimated nature of the plasma stream, a faster and squarer cut may be made at the edge of the work blank 13 cut from the workpiece 11. Tests have established that a given workpiece may be cut approximately 25 percent faster with the present nozzle 30 as opposed to a conventional commercially available nozzle. Also, the upper corner of the cut in the work blank 13 made by the present nozzle 30 is virtually square and usually is radiused only about one or two degrees while the side of the cut along the work blank 13 is vertical. For a reason that is not totally understood, the opposite side of the cut tends to converge downwardly the same as with a conventional nozzle but that is not significant since the converging side of the cut is on a "skeleton" which ultimately becomes scrap. The straight cut can be established on the usable work blank 13 rather than on the skeleton by controlling the direction of advance of the workpiece relative to the torch.

The specific dimensional parameters which have been given above are for a 165 amp torch which discharges the plasma stream at twice the speed of sound (Mach 2) and which maintains a current density of 62,000 amps/in$^2$ at the lower end of the exit portion 40 of the nozzle 30. The principles of the invention are applicable to torches ranging between 45 amps and 250 amps with the velocity of the plasma stream discharged being either at Mach 2 or at Mach 3. To keep the current density constant at 62,000 amps/in$^2$ for torches within such range, the diameter of the throat 36 may range from 0.030" to 0.075", the diameter of the lower end of the exit portion 40 may range from 0.039" to 0.150", the axial distance from the throat to the lower end of the exit portion may range from 0.040" to 0.125" and the radius R-2 may range from 0.050" to 0.5". The smaller dimensions in each range apply to lower powered torches discharging a stream at Mach 2 while the larger dimensions apply to torches of higher power discharging a stream at Mach 3.

In the present instance, the passage 33 is shaped by cold forming the nozzle 30 from its upper side to form the tapered entrance portion 35 and the radiused throat 36. The exit portion 40 is formed from the lower end of the nozzle by a specially shaped rotating cutter.

We claim:

1. A vertically extending plasma arc torch for cutting an electrically conductive workpiece disposed in a horizontal plane spaced below the lower end of the torch, said torch comprising a body having an electrode therein adapted to be connected to one terminal of a source of d.c. voltage having an oppositely poled terminal adapted for connection to said workpiece whereby an electric arc is directed downwardly across the gap between said electrode and said workpiece, means for directing a downward flow of pressurized oxygen-containing gas through said body and into said arc whereby said gas is ionized to create a plasma stream directed downwardly toward said workpiece, and a nozzle attached to said body and located below said electrode for shaping said plasma stream and increasing the velocity thereof, said nozzle having a vertically extending discharge portion terminating in an extreme lower end, a discharge passage extending through said discharge end portion and having a vertically extending longitudinal axis, said passage being of circular cross-section and having an entrance portion which converges radially inwardly upon progressing downwardly toward said lower end, said passage having a reduced diameter throat immediately below said entrance portion, and said passage having an exit portion immediately downstream of said throat and of larger diameter than said throat, said exit portion being defined by an annular wall which is arcuately concave both circumferentially and axially and which is perpendicular to a horizontal plane containing the extreme lower end of said nozzle.

2. A plasma arc torch as defined in claim 1 in which the ratio of the maximum diameter of said exit portion to the minimum diameter of said throat ranges from approximately 1.3 to approximately 2.

3. A plasma arc torch as defined in claim 2 in which each generally axially extending line along said annular wall defines a concave arc struck about a center which lies in said plane, the radius of said arc ranging from approximately 0.05" to approximately 0.5".

4. A plasma arc torch as defined in claim 3 in which said radius is approximately 0.36".

* * * * *